INVENTORS
FRANK W. ARMSTRONG, JR.
OTIS R. CARPENTER &
REIDAR P.C. RASMUSEN
BY
ATTORNEY

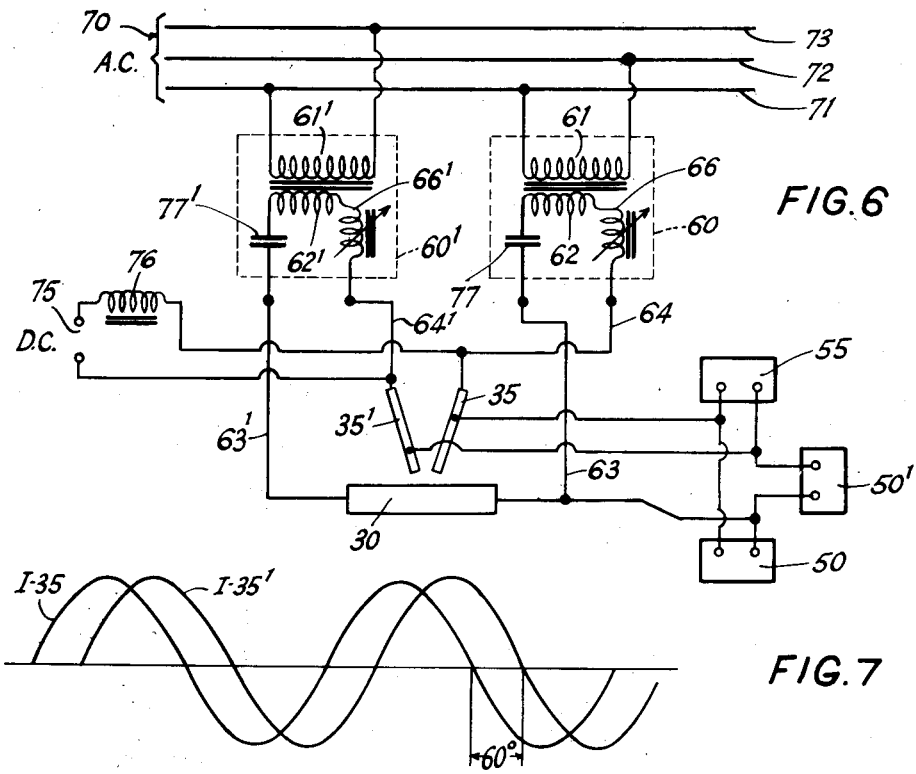
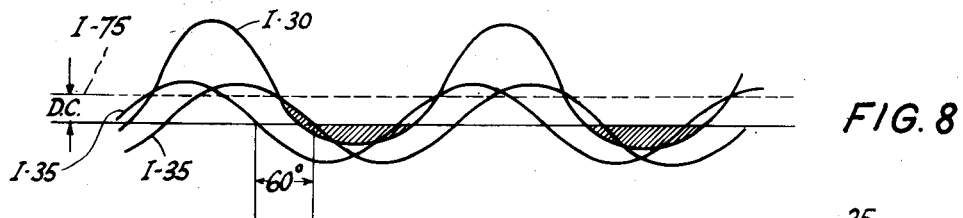
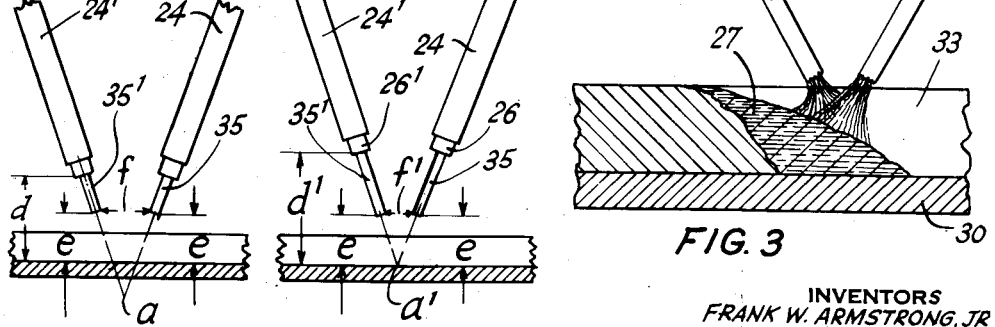

Jan. 22, 1952  O. R. CARPENTER ET AL  2,583,507
POLYPHASE ALTERNATING CURRENT FUSION WELDING WITH CONTROL
OF INTERPHASE VOLTAGE, AND WITH COMBINED ALTERNATING
CURRENT AND DIRECT CURRENT WELDING POTENTIALS
Filed April 4, 1949  5 Sheets-Sheet 5
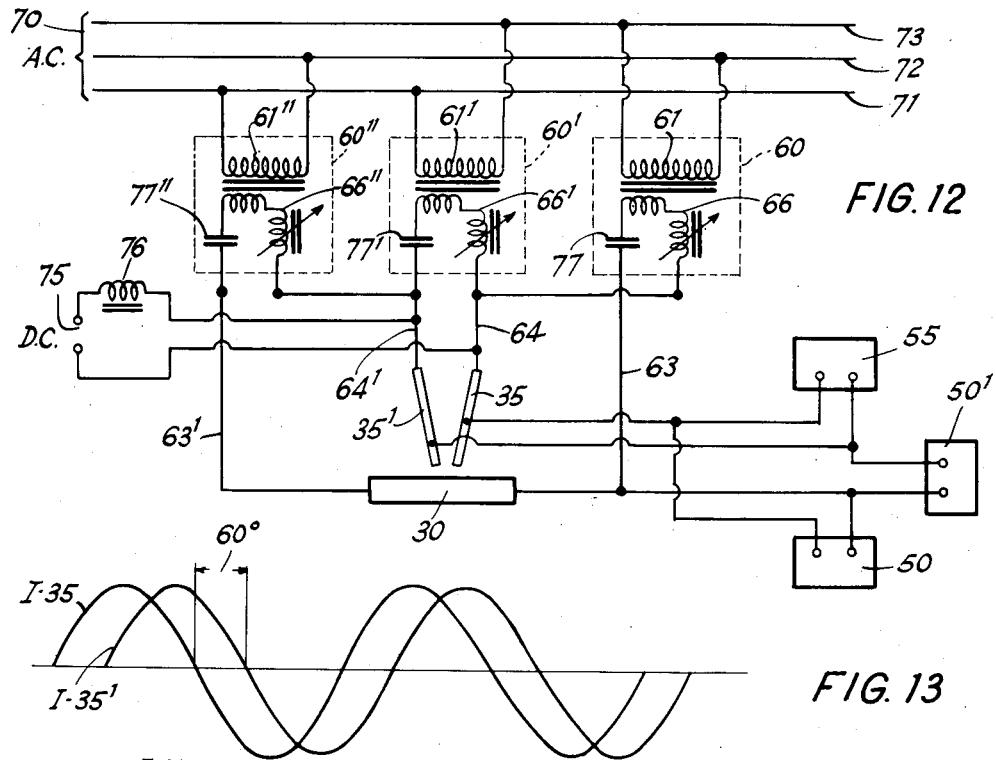
FIG. 12
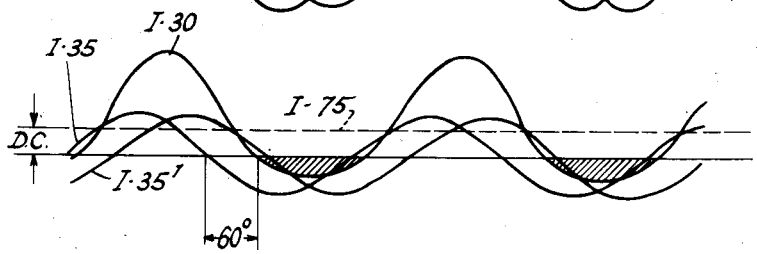
FIG. 13
FIG. 14
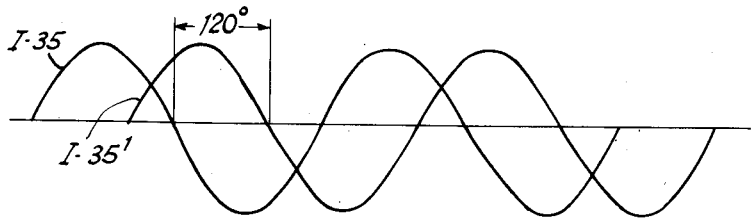
FIG. 15
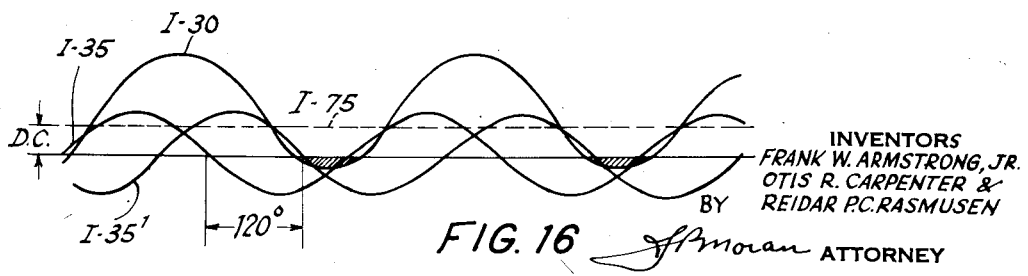
FIG. 16
INVENTORS
FRANK W. ARMSTRONG, JR.
OTIS R. CARPENTER &
REIDAR P.C. RASMUSEN
BY
ATTORNEY Patented Jan. 22, 1952

2,583,507

UNITED STATES PATENT OFFICE 2,583,507

POLYPHASE ALTERNATING CURRENT FUSION WELDING WITH CONTROL OF INTERPHASE VOLTAGE, AND WITH COMBINED ALTERNATING CURRENT AND DIRECT CURRENT WELDING POTENTIALS

Otis R. Carpenter and Frank W. Armstrong, Jr., Barberton, and Reidar P. C. Rasmusen, Akron, Ohio, assignors to The Babcock & Wilcox Company, Rockleigh, N. J., a corporation of New Jersey Application April 4, 1949, Serial No. 85,284

11 Claims. (Cl. 219—8)

This invention relates to electric welding with metallic electrodes and, more particularly, to a polyphase A. C. welding system and method in which close control of the welding voltage is effected with a very high power factor and a high metal fusion rate.

It has been proposed, in the prior art, to arrange multiple metallic welding electrodes in a polyphase A. C. welding circuit, with the welding taking place in a common weld zone on the work. Generally, the work is included in the welding circuit. The electrodes may be bare wire used in an open or submerged arc system, or may be coated with a suitable flux, depending upon the conditions involved. Control of the feeding of the electrodes has been effected by individual welding voltage responsive feeding means for each electrode and each independently controlling the spacing of such electrode from the work.

In accordance with the present invention, it has been found that more accurate and closer control of the welding conditions may be obtained by controlling the interphase voltage between pairs of electrodes in addition to the above mentioned independent controlling of the voltage between each electrode and the work. This feature is of particular importance where the welding currents of all the electrodes merge in a common welding zone to form a common pool of fused metal. The greatly increased heat input serves to speed the welding operation as well as to reduce the number of beads or passes required in welding relatively thick seams.

An important feature of the present invention is the superposing of a D. C. potential across one of the phases of the polyphase welding circuit, or between two of the phases thereof. Preferably, this D. C. potential is impressed between a pair of the movable electrodes, and suitable means, such as condensers and chokes, are provided to block the flow of direct current into the welding transformers and of alternating current into the D. C. supply.

Such superimposed D. C. potential gives the advantage of high fusion rates of the electrodes, while at the same time providing greatly improved stability in arc welding. As a result, better control of the weld metal deposit is possible. Such stability and control have not hitherto been possible, with the high fusion rates resulting from heavy direct currents, due to the magnetic arc blow-effects occurring in the weld zone. The magnetic blow is compensated and its effects eliminated by the A. C. field due to the polyphase welding circuit. The superimposed D. C. potential further substantially eliminates extinction points in the A. C. welding potential, which also contributes to stability and control of the metal deposition at high fusion rates. The power factor of the welding circuit is raised substantially by the superimposed direct current.

With the foregoing in mind, it is an object of the present invention to provide an improved polyphase A. C. welding system and method.

Another object is to provide such a system and method involving the connection of multiple electrodes and the work in a polyphase A. C. welding circuit with independent control of the voltages between each electrode and the work, and independent control of the voltage between the electrodes.

A further object is to provide such a system and method in which a D. C. potential is superimposed on one of the phases or between two phases to attain high fusion rates and impose the power factor.

Yet another object is to provide such a system and method in which a pair of metallic electrodes and the work are connected in a polyphase welding circuit, the position of each electrode relative to the work is individually controlled by mechanism responsive to the voltage between such electrode and the work, and the spacing of the electrodes from each other is independently controlled by other mechanism responsive to the voltage between the electrodes.

These and other objects, advantages and novel features will be apparent from the following description and the accompanying drawings. In the drawings:

Fig. 3 is an enlarged vertical sectional view through a weld zone showing the electrodes operating in a common pool of molten metal on the work;

Figs. 4 and 5 are somewhat schematic elevation views of the electrodes and the work showing the variation of inter-electrode spacing in accordance with variation in the vertical spacing of the welding heads from the work;

Figure 9:
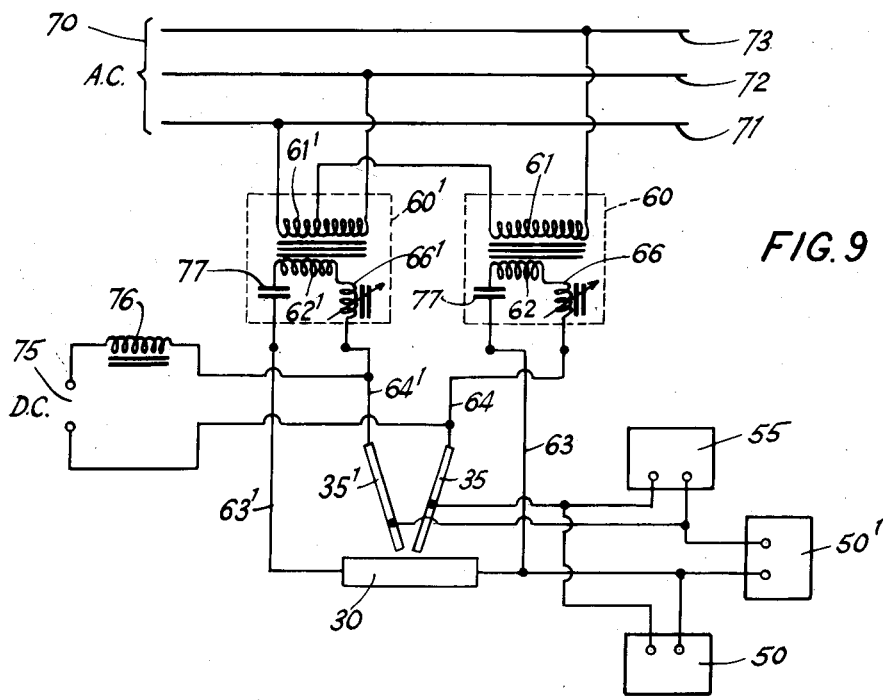
Figure 10:
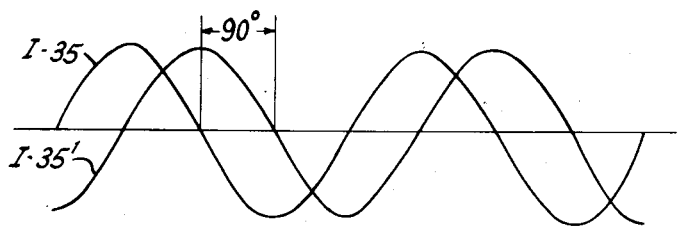
Figure 11:
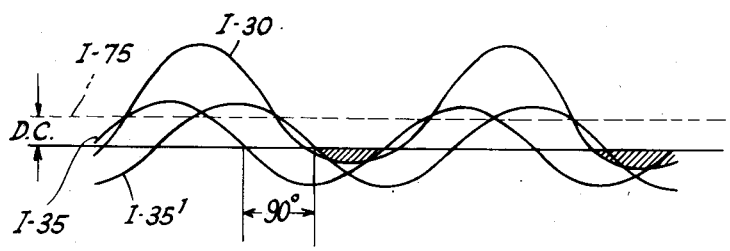

Fig. 6 is a schematic wiring diagram of a polyphase A. C. welding circuit embodying the invention and having a D. C. potential impressed thereon;

Figs. 7 and 8 are sets of curves illustrating the welding current relationships with the welding circuit of Fig. 6;

Figs. 9 and 12 are schematic wiring diagrams, similar to that of Fig. 6, showing other welding circuit arrangements embodying the invention;

Figs. 10 and 11 are sets of curves showing the welding current relationships of the circuit of Fig. 9;

Figs. 13 and 14 are sets of curves showing the welding current relationships of the circuit of Fig. 12; and Figs. 15 and 16 are sets of curves showing the welding current relationships of the circuit of Fig. 12 but with differing angular relations between the currents of each phase.

The principles of the present invention are applicable to any type of electric fusion welding, such as open arc welding, gaseous arc welding, or submerged arc welding. The multiple electrodes may be of fusible metal and used to supply metal to the weld zone, or the electrodes may be substantially non-fusible, such as carbon or tungsten electrodes, and the additional weld metal, if needed, may be separately supplied. Furthermore, the invention may be used with either bare or flux coated electrodes.

Due to the high fusion rates possible with the invention system, it is possible to use flux coated electrodes to weld single pass seams in thick metal members. Hitherto, this has been not practically possible even with submerged arc welding, as the results have not been satisfactory because of the high volume of slag and the difficulty of guiding the electrode accurately along a deep groove filled with submerged arc welding flux. The present invention not only makes possible the successful welding of deep seams or grooves with a single pass and without such difficulties, but also provides for a better control of the flux composition. This latter is made possible by using a non-sintered coating on the electrodes instead of the fused or sintered powdered flux used with submerged arc welding, and which has restrictions on its composition due to such fusing or sintering and will not work satisfactorily for slightly off-analysis base materials.

Figure 1:
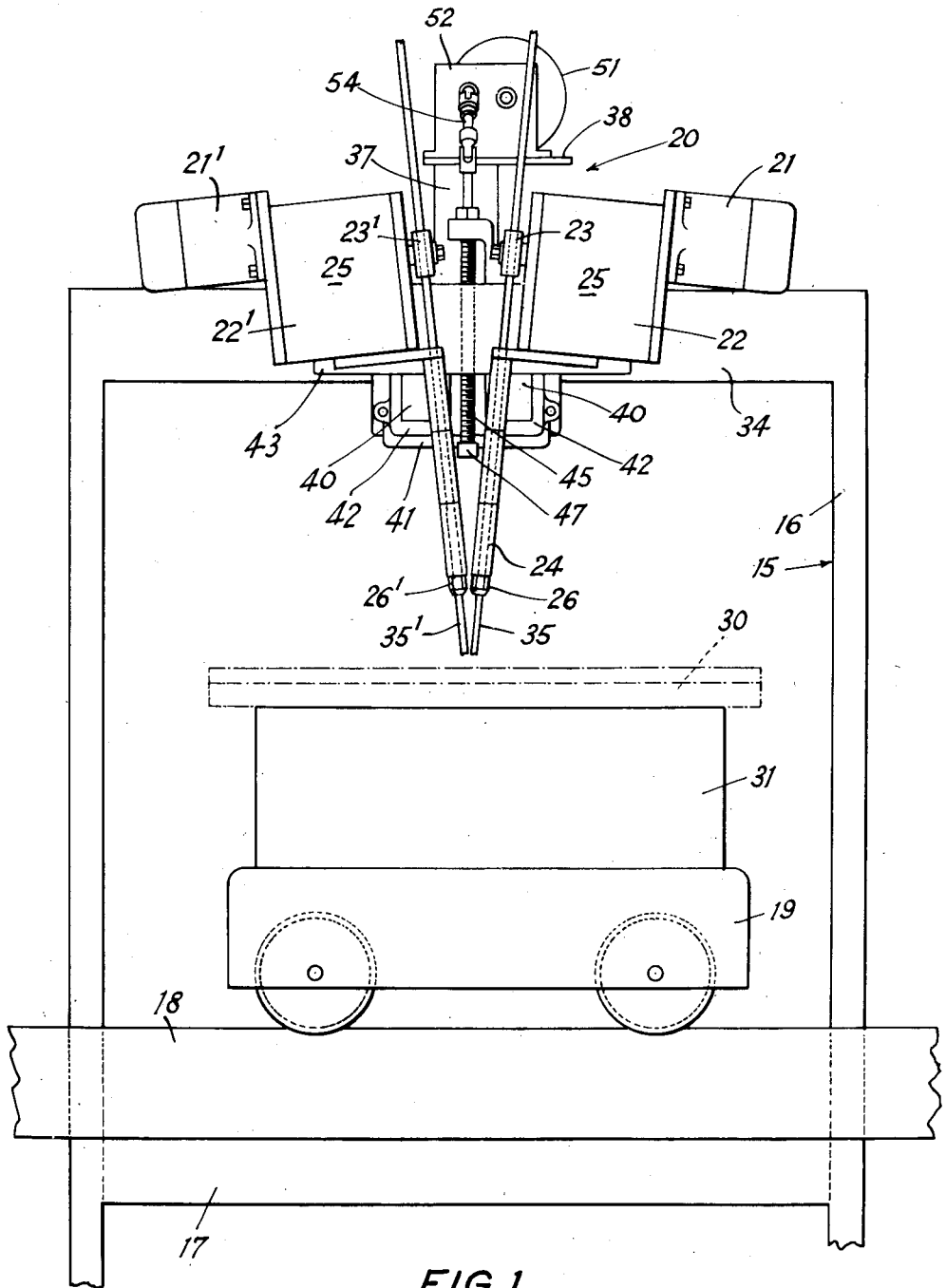
Fig. 1 is a front elevation view of multiple electrode electric welding apparatus embodying the invention.
Figure 2:
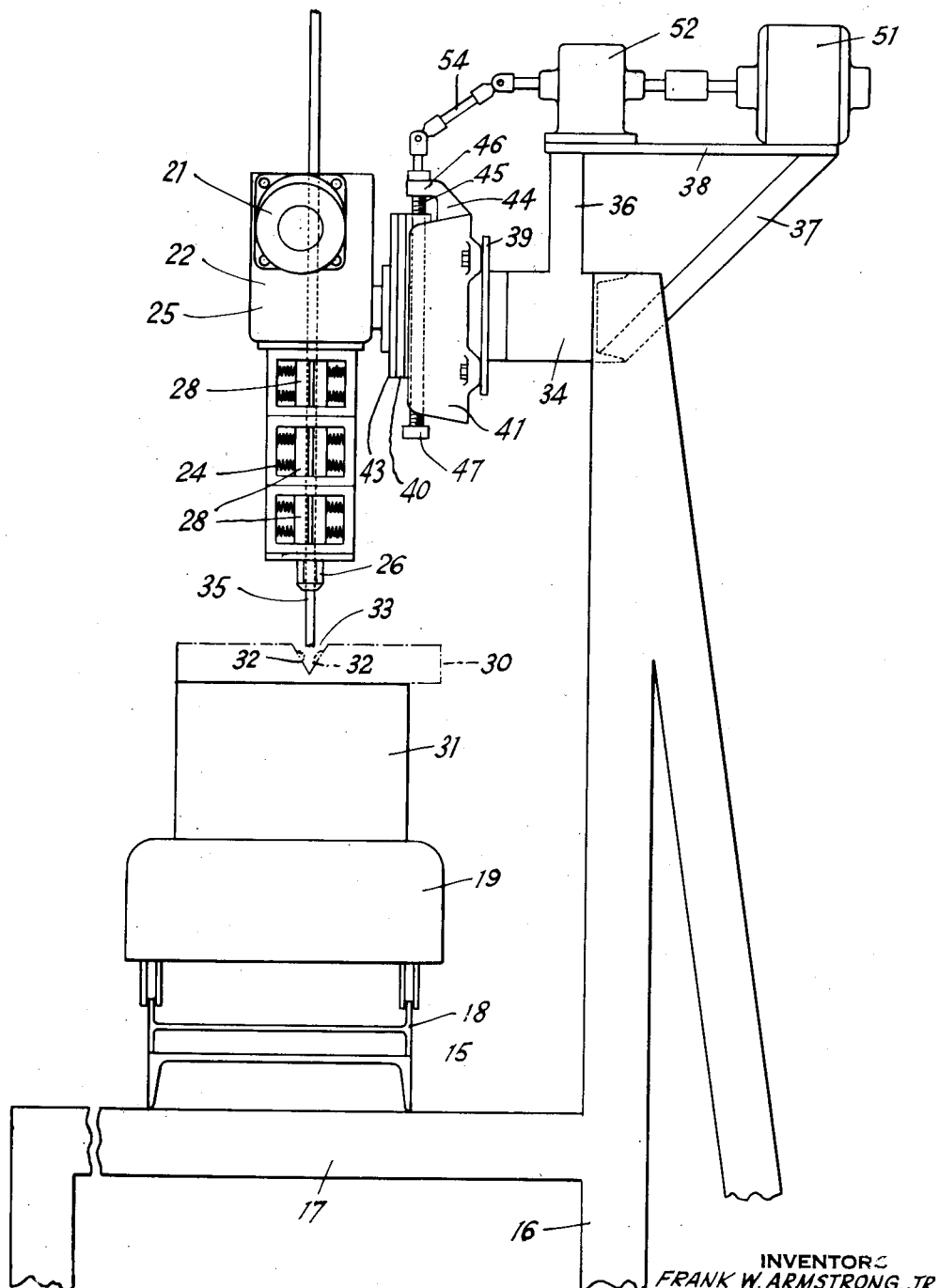
Fig. 2 is a side elevation view of the apparatus.

Referring to Figs. 1, 2 and 3, a multiple welding electrode positioning mechanism 20, according to the invention, is illustrated as mounted on the upper end of a vertical column member 16 of a frame 15. The latter has an elevated platform or shelf 17 on which are rails 18 for a suitable work travel mechanism, shown schematically as a car 19. Car 19 has a support 31 for a metallic workpiece 30 which has a pair of facing surfaces 32, 32, forming a welding groove or zone 33. As metal is fused in welding zone 33, suitable means (not shown) moves car 19 along rails 18 so that movement of work 30 is coordinated with the rate of fusion of metal in zone 33.

To support mechanism 20, a support member 34 extends transversely of frame 15 and carries a vertical leg 36 which, in combination with a brace 37, supports a platform 38. A forwardly extending support on member 34 has a flange 39 which carries a vertically extending guide member 41 having rails 42 which slidably receive a pair of slides 40 bolted to a horizontal support 43. Member 41 has an extension 44 carrying a thrust bearing 46 for a screw shaft 45 which has threaded engagement with member 43. Rotation of shaft 45 effects vertical sliding movement of slides 40 along the rails of guide member 41. An abutment 47 on the lower end of shaft 45 limits downward movement of horizontal member 43, and upward movement thereof is limited by bearing 46.

Horizontal member 43 supports the welding electrode adjusting mechanisms 25, 25' which are bolted thereto and angularly adjustable thereon by loosening the bolts. Two mechanisms 25, 25' are shown although three or more may be used if desired, and adjust the distance between the ends of electrodes 35, 35' and work 30. As the mechanisms are identical, only one will be described in some detail, similar reference characters primed being used to designate corresponding components of the other adjusting mechanism.

Mechanism 25 includes a shunt wound D. C. motor 21 which, through a gear reducer 22, drives rotatable feed rolls 23 engaging electrode 35. The latter may be either fusible or substantially non-fusible metal, and may be either bare or coated with a suitable flux, all dependent upon the particular type of welding to be effected. In the case of flexible wire electrodes, the electrodes are preferably withdrawn from suitable storage reels (not shown) which may be supported on frame 15. Rollers 23 feed electrode 35 through a suitable bus bar or contact shoe arrangement 24 including shoes 28 which conduct the welding current to the electrode, and arrangement 24 has a guide nozzle 26 on its lower end.

It will be noted from Fig. 1 that bus bar arrangements 24, 24' converge downwardly so that the center lines of electrodes 35, 35', if projected, would intersect in weld groove 33. From Fig. 3 it will be seen that the welding action takes place in a common pool 27 of molten weld metal, which latter may comprise fused work metal and also metal fused from the electrodes, if the latter are of fusible metal. Alternatively, fusible weld filler metal may be separately supplied to pool 27 if necessary or desirable. To simplify the disclosure, Fig. 3 illustrates the invention as applied to open arc welding with bare fusible electrodes, but it will be understood that the principles of the invention are applicable to flux coated electrodes, to submerged melt electric welding, or to gaseous atmosphere welding with fusible or non-fusible metallic electrodes.

Welding mechanisms 25, 25' are individually controlled by suitable voltage responsive control mechanisms 50, 50', which may be of any well-known type commonly used in automatic electric welding apparatus. A typical voltage responsive control circuit which may be used with the present invention is shown and described in the copending application of O. R. Carpenter et al., Serial Number 574,682, filed January 26, 1945, now Patent Number 2,518,222 of August 8, 1950, for "Electric Control System." Mechanisms 50, 50' independently control the positions of electrodes 35, 35' relative to work 30, preferably maintaining the two voltages at predetermined constant values and the fusing ends of the electrodes at constant distances from the work, and with the voltages and distances substantially equal to each other. However, the voltages and the electrode-to-work spacings may be maintained at different values for certain applications.

In accordance with the present invention, electrodes 35, 35' and work 30 are connected in a polyphase welding circuit (through the medium of contact shoes 28 and suitable leads) with the work 30 being connected to a common junction of each of the phases to which electrodes 35, 35' are so connected. Thus, mechanisms 50, 50' in effect regulate the welding voltages of such phases. It has been found, however, that a closer control of welding conditions, and thus a more uniform deposition of weld metal, can be effected by also controlling the voltage between the electrodes 35, 35'. In a three-phase welding circuit, this amounts to a control of the welding voltage of the third phase, whereas, in a two-phase welding circuit, this amounts to a control of the inter-phase welding voltage.

In the arrangement of Figs. 1 and 2, this is effected by simultaneous vertical adjustment of the welding heads 25, 25' to effect a corresponding variation of the distance between the tips of electrodes 35, 35'. Such adjustment may also be effected by swinging the welding heads 25, 25' in the vertical plane of the electrodes 35, 35'. To move both heads vertically simultaneously, a shunt-wound D. C. motor 51 on platform 38 drives a gear reducer 52. The output shaft of reducer 52 is connected, through flexible or universal connections 54, to screw shaft 45. Rotation of the latter, in either direction, effects vertical movement of member 43 to adjust heads 25, 25' vertically as a unit.

Motor 51 is controlled by a voltage responsive control circuit 55 which is connected to be responsive to the voltage between electrodes 35 and 35'. Mechanism 55 may be of the same type as mechanisms 50 and 50', and operates to control motor 51 in accordance with the voltage between electrodes 35 and 35'.

The operative effect of the control by mechanism 55 may be best understood by reference to Figs. 4 and 5. In Fig. 4, the lower ends of bus bar arrangements 24, 24' are shown at a distance "d" from the root of groove 33 such that the intersection "a" of the projected center lines of electrodes 35, 35' lies below work 30. The distances "e" between the fusing ends of electrodes 35, 35' and work 30 are controlled by the voltage responsive means 50 and 50', respectively. The distance between the electrode tips is indicated at "f."

In Fig. 5, mechanism 55 has actuated motor 51 to elevate both welding heads 25, 25' so that the distance of the lower ends of bus bar arrangements 24, 24' from the root of groove 33 has been increased to the value "d'." The intersection of the projected electrode center lines has been correspondingly raised to "a'." During such raising operation, the individual controls 50, 50' have operated through mechanisms 25, 25' to maintain at the same preset value the spacings "e" of the fusing ends of electrodes 35, 35' from the root of groove 33, by projecting the tips of the electrodes 35, 35' further from bus bar arrangements 24, 24'. As the lateral spacing of the lower ends of arrangements 24, 24' remains fixed, such projection of the electrodes brings their fusing ends closer together as indicated at "f'," to reduce the voltage drop therebetween. Thus, mechanism 55 can regulate such voltage drop by raising or lowering heads 25, 25'.

In the event it is desired to control or adjust the inter-electrode spacing by the afore-mentioned alternative of conjointly swinging mechanisms 25, 25' in the common plane of the electrodes, screw 45 may be replaced by a worm. Each mechanism 25, 25' is then swingably mounted on member 43 and has a worm gear or sector secured to move therewith and meshed with the worm. The axes of the worm gears or sectors coincide with the axes of swinging movement. Rotation of the worm in a selected direction by motor 51 then operates both worm gears or sectors to swing the mechanisms to move the electrode tips toward and away from each other.

Representative polyphase welding circuits according to the invention are schematically illustrated in Figs. 6, 9, and 12. In these figures, only the voltage control mechanisms 50, 50' and 55 are shown in cooperation with electrodes 35, 35' and work 30, it being understood that these mechanisms are connected by suitable circuits to control motors 21, 21' and 51, respectively, in a suitable known manner.

In the arrangement of Fig. 6, a pair of welding transformers 60, 60' have one terminal of each of their primary windings 61, 61' commonly connected to a conductor 71 of a three-phase supply circuit 70. The other primary winding terminals are respectively connected to conductors 72 and 73 of circuit 70. Conductors 63, 63' each connect one terminal of secondary windings 62, 62' to work 30. The other secondary winding terminals are respectively connected by conductors 64, 64' to electrodes 35, 35'. Variable reactors 66, 66' are connected in the secondary circuits in the usual manner with welding transformers. Electrode 35 and work 30 are thus connected in phase 71—72, electrode 35' and work 30 are connected in phase 71—73, and electrodes 35 and 35' are connected in phase 72—73. The equivalent electrical hook up is a three-phase, two winding, or open delta system, with the windings connected in V relation.

The voltage between electrode 35 and work 30 is controlled by mechanism 50 which is connected to have applied thereto the potential between electrode 35 and work 30. Similarly, mechanism 50' is connected to have applied thereto the potential between electrode 35' and work 30. As described, mechanisms 50, 50' thus individually control the operation of electrode adjusting heads 25, 25', respectively, to independently control each of the separate electrode-to-work potentials. The spacing of the tips of electrodes 35, 35' from each other is controlled by unit 55 which is connected to have applied thereto the inter-electrode potential, and controls the slide positioning motor 51. Such control of the inter-electrode voltage assures better control of the welding and more uniform disposition of weld metal in groove 33.

In further accord with the present invention, a high metal fusion rate and a substantial elimination of welding current extinction points is provided by superimposing a D. C. voltage on one of the phases of the polyphase A. C. welding circuit. With this arrangement, the high "burn-off" rates of D. C. welding are obtained without the attendant disadvantages, as the A. C. welding circuit eliminates the effects of magnetic blow encountered in high current D. C. welding and the overall power factor of the welding circuit is substantially increased.

Referring again to Fig. 6, a source of direct current 75, such as a suitable D. C. generator or a rectifier, has its output terminals connected to apply a D. C. potential between conductors 64 and 64'. A choke 76 is included in the D. C. circuit to prevent flow of A. C. therethrough, and condensers 77, 77' are connected in the secondary circuits of transformers 60, 60' to prevent the flow of D. C. therethrough, the A. C. and D. C. circuits thus being effectively separated except at the welding zone.

The results of the combination of A. C. and D. C. potentials in the welding circuit are graphically illustrated in Figs. 7 and 8, wherein curve I-35 represents the alternating current flow through electrode 35 and I-35' that through electrode 35', transformer 60 being connected to power supply 70 with reverse polarity, so that I-35' is phase spaced 60°, in one direction, from I-35, or 300° in the opposite direction. No welding current flows until the instantaneous value of the applied welding voltage is equal to the ionization potential of the medium surrounding the welding zone. At such point, the resistance of the medium to flow of current, such as an arc current, is broken down and the welding current flows between the electrodes and the work.

In Fig. 8, curve I-75 represents the constant value direct current imposed on the welding circuit from source 75. When curves I-35, I-35' and I-75 are graphically combined, the resultant welding current curve I-30 is obtained, which represents the total welding current in metal pool 27 to which all the arcs are common. It will be noted that the major portion of curve I-30 is above the zero line, dependent upon the value of I-75, so that there is only a minor ineffective welding current component below the zero line. In effect, a pulsating D. C. welding current is provided, having sufficient polarity reversal to eliminate the effects of magnetic blow while retaining the high fusion rates possible with large D. C. welding currents.

The principles of the invention are not limited to three-phase welding but may be applied to other polyphase welding circuits. Thus, in Fig. 9, transformers 60, 60' are Scott connected to source 70 and the welding circuit to provide a two-phase arrangement. Each electrode 35, 35' is connected in one phase, and work 30 is commonly connected to both phases. The voltage responsive controls 50, 50' are connected as in Fig. 6, but unit 55 is now responsive to the interphase voltage, being again connected to electrodes 35, 35' each of which is in a separate phase of the system.

In Fig. 10, curves I-35 and I-35' are shown with 90 or 270 degrees phase spacing, as is inherent in two-phase systems. The resultant welding current curve I-30, as seen in Fig. 11 is substantially the same as that of Fig. 8.

In the arrangement of Fig. 12, three transformers 60, 60' and 60'' are connected between source 70 and the welding in delta-delta arrangement, with transformer 60' being connected with reverse polarity to provide a 60° phase spacing of I-35 and I-35', as shown in Fig. 13. The superimposed D. C. component I-75 and the resultant welding current I-30 are graphically illustrated in Fig. 14.

Fig. 15 shows the electrode current relationship with transformer 60' connected with straight polarity to provide a 120° phase spacing of I-35 and I-35'. D. C. component I-75 and welding current I-30 are shown graphically in Fig. 16.

The described arrangements provide for more effective control of welding conditions and more uniform disposition of weld metal. The superimposed D. C. component provides the high fusion rates characteristic of heavy direct currents, with the A. C. components eliminating the attendant effects of magnetic blow. Additionally, the overall power factor of the welding circuit is increased. It is possible, with the invention arrangement, to use flux coated electrodes to fill deep grooves in a single pass without the difficulties inherent in submerged arc welding.

While specific embodiments of the invention have been shown and described in detail to illustrate the invention principles, it will be understood that the invention may be embodied otherwise without departing from such principles.

We claim:

1. Electric welding apparatus comprising, in combination, a plurality of relatively movable electrodes; a relatively fixed electrode; means connecting said electrodes in a polyphase welding circuit; first circuit characteristic responsive adjustment means associated with said movable electrodes and controlling the arc lengths therebetween; and second circuit characteristic responsive adjustment means associated with said movable electrodes and said fixed electrode and operable conjointly with said first adjustment means to control the arc lengths between said movable electrodes and the fixed electrode.

2. Electric welding apparatus comprising, in combination, a plurality of relatively movable electrodes; a relatively fixed electrode; means connecting said electrodes in a polyphase welding circuit; separate mechanisms each controlling the position of a movable electrode with respect to the fixed electrode; individual control means for each mechanism operative, responsive to variations from a predetermined value of the voltage between the associated movable electrode and said fixed electrode, to activate the controlled mechanism in a corrective direction; positioning mechanism operatively associated with both movable electrodes for conjoint operation with said separate mechanisms for controlling the spacing of said movable electrodes from each other; and arc voltage responsive control means for said positioning mechanism operative, responsive to variations from a predetermined value of the voltage between said movable electrodes, to activate said positioning mechanism in a corrective direction.

3. Electric welding apparatus comprising, in combination, a pair of electrodes; a pair of mechanisms each individually controlling the position of one electrode relative to the work to be welded; means connecting said electrodes and the work in a polyphase welding circuit; individual control means for each mechanism operative, responsive to variations from a predetermined value of the voltage between the associated electrode and the work, to activate the controlled mechanism in a corrective direction; positioning mechanism operatively associated with both movable electrodes for conjoint operation with said separate mechanisms for controlling the spacing of said electrodes from each other; and arc voltage responsive control means for said positioning mechanism operative, responsive to variations from a predetermined value of the voltage between said electrodes, to activate said positioning mechanism in a corrective direction.

4. Electric welding apparatus comprising, in combination, a pair of fusible metal electrodes; a pair of mechanisms each individually controlling the position of one electrode relative to the work to be welded; means connecting said electrodes and the work in a polyphase welding circuit to fuse metal from said electrodes and coalesce such fused metal with metal fused from the work in a common pool of fused metal in the weld zone; individual control means for each mechanism operative, responsive to variations from a predetermined value of the voltage between the fusing ends of the associated electrode and the work, to activate the controlled mechanism in a corrective direction; positioning mechanism operatively associated with both movable electrodes for conjoint operation with said separate mechanisms for controlling the spacing of the fusing ends of said electrodes from each other; and arc voltage responsive control means for said positioning mechanism operative, responsive to variations from a predetermined value of the voltage between the fusing ends of said electrodes, to activate said positioning mechanism in a corrective direction.

5. A method of electrically weld uniting opposing metal workpiece surfaces arranged to form a welding zone, such method comprising maintaining a plurality of welding electrodes along the weld zone with their arcing ends in converging relation; connecting said electrodes and the surface in a polyphase welding circuit to effect metal fusion in the welding zone; adjusting each electrode longitudinally of itself to control the distance between the arcing ends of the electrodes; conjointly with such individual electrode adjustments, adjusting all of said electrodes as a group relative to the welding zone to control the distance between the arcing end of each electrode and the workpiece surfaces.

6. A method of electrically weld uniting opposing metal workpiece surfaces arranged to form a welding zone, such method comprising maintaining a plurality of fusible metal welding electrodes along the weld zone; connecting said electrodes and the surfaces in a polyphase welding circuit to fuse metal from said electrodes and coalesce such fused metal with metal fused from the workpiece surfaces in a common pool of fused metal in the weld zone; separately feeding said electrodes simultaneously toward each other and toward the workpiece surfaces as metal is fused from the electrodes; coordinating relative movement of the electrodes and such pool, along the weld zone, with the rate of deposition of fused weld metal; individually measuring the voltage between each electrode and the workpiece surfaces; using such individual measurements to control the arc length between each electrode and the workpiece surfaces; separately measuring the voltage between said electrodes; and using such individual measurements conjointly with such separate measurement to conjointly adjust both electrodes relative to the work to control the arc length between the electrodes.

7. Electric welding apparatus comprising, in combination, a pair of fusible metal electrodes; means positioning said electrodes in operative relation to the work to be welded and to each other; a source of polyphase A. C. potential; a source of D. C. potential; means, including welding transformers, connecting said electrodes and the work to said A. C. source to provide a polyphase welding circuit, the transformer primary windings being connected across different phases of said A. C. source; secondary circuit connections between the transformer secondary windings, both fusible electrodes and the work, the transformer secondary windings and such connections being constructed and arranged to provide a polyphase secondary welding circuit producing one phase potential between said fusible electrodes, another phase potential between one electrode and the work, and a third phase potential between the other electrode and the work; other circuit connections between said D. C. source and said fusible electrodes to impress a D. C. potential across the latter; condensers included in said secondary connections to block the flow of D. C. through the secondary windings; and an inductance included in said other circuit connections to block the flow of A. C. through said other circuit connections.

8. Electric welding apparatus as claimed in claim 7 in which the A. C. source is three-phase, and including a pair of transformers V-connected between the A. C. source, the fusible electrodes, and the work.

9. Electric welding apparatus as claimed in claim 7 in which the A. C. source is three-phase, and including a pair of transformers T-connected between the A. C. source, the fusible electrodes, and the work.

10. Electric welding apparatus as claimed in claim 7 in which the A. C. source is three-phase, and including three (3) transformers having their primary windings delta connected to the A. C. source and their secondary windings delta connected to the fusible electrodes and the work with reversed polarity to produce a 60 degree phase relation between the alternating currents through the fusible electrodes.

11. Electric welding apparatus as claimed in claim 7 in which the A. C. source is three-phase, and including three (3) transformers having their primary windings delta connected to the A. C. source and their secondary windings delta connected to the fusible electrodes and the work with straight polarity to produce a 120 degree phase relation between the alternating currents through the fusible electrodes.

OTIS R. CARPENTER.
FRANK W. ARMSTRONG, Jr.
REIDAR P. C. RASMUSEN.

REFERENCES CITED

The following references are of record in the file of this patent:

UNITED STATES PATENTS

| Number | Name | Date |
| --- | --- | --- |
| 1,610,920 | Bethenod | Dec. 14, 1926 |
| 1,707,036 | Zack | Mar. 26, 1929 |
| 2,061,671 | Riemenschneider | Nov. 24, 1936 |
| 2,139,160 | Hebeler | Dec. 6, 1938 |
| 2,436,387 | Harter et al. | Feb. 24, 1948 |
| 2,437,840 | Steward et al. | Mar. 16, 1948 |
| 2,489,002 | Babbitt | Nov. 22, 1949 |